United States Patent
Csar et al.

(10) Patent No.: US 11,610,109 B2
(45) Date of Patent: Mar. 21, 2023

(54) LANGUAGE AGNOSTIC MACHINE LEARNING MODEL FOR TITLE STANDARDIZATION

(71) Applicant: Microsoft Technology Licensing, LLC, Redmond, WA (US)

(72) Inventors: Sebastian Alexander Csar, New York, NY (US); Uri Merhav, Rehovot (IL); Dan Shacham, Sunnyvale, CA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 1175 days.

(21) Appl. No.: 16/142,441

(22) Filed: Sep. 26, 2018

(65) Prior Publication Data

US 2020/0097812 A1 Mar. 26, 2020

(51) Int. Cl.
| | |
|---|---|
| *G06N 3/08* | (2023.01) |
| *G06Q 10/06* | (2023.01) |
| *G06F 16/28* | (2019.01) |
| *G06N 3/04* | (2023.01) |
| *G06Q 10/0631* | (2023.01) |

(52) U.S. Cl.
CPC ............. *G06N 3/08* (2013.01); *G06F 16/285* (2019.01); *G06N 3/04* (2013.01); *G06Q 10/063112* (2013.01)

(58) Field of Classification Search
CPC ............ G06N 3/08; G06N 3/04; G06N 5/003; G06N 5/022; G06N 7/005; G06N 20/10; G06N 20/20; G06N 3/0427; G06N 3/0454; G06N 3/084; G06F 16/285; G06F 16/36; G06F 16/9532; G06Q 10/063112

See application file for complete search history.

(56) References Cited

U.S. PATENT DOCUMENTS

| | | | |
|---|---|---|---|
| 9,904,871 B2* | 2/2018 | Merhav | G06N 3/084 |
| 10,832,219 B2* | 11/2020 | Jersin | H04L 51/222 |
| 2018/0144253 A1* | 5/2018 | Merhav | G06F 16/2228 |

OTHER PUBLICATIONS

Ritter, A., Cherry, C., & Dolan, B. (Jan. 2011). Data-driven response generation in social media. In Empirical Methods in Natural Language Processing (EMNLP). (Year: 2011).*

* cited by examiner

*Primary Examiner* — Brian M Smith
*Assistant Examiner* — Henry Trong Nguyen
(74) *Attorney, Agent, or Firm* — Nicholson De Vos Webster & Elliott LLP (57) ABSTRACT

In an example embodiment, a system is provided whereby a machine learning model is trained to predict a standardization for a given raw title. A neural network may be trained whose input is a raw title (such as a query string) and a list of candidate titles (either title identifications in a taxonomy, or English strings), which produces a probability that the raw title and each candidate belong to the same title. The model is able to standardize titles in any language included in the training data without first having to perform language identification or normalization of the title. Additionally, the model is able to benefit from the existence of "loan words" (words adopted from a foreign language with little or no modification) and relations between languages.

20 Claims, 8 Drawing Sheets

LANGUAGE AGNOSTIC MACHINE LEARNING MODEL FOR TITLE STANDARDIZATION

TECHNICAL FIELD

The present disclosure generally relates to computer technology for solving technical challenges in analyzing taxonomy data in social networks. More specifically, the present disclosure relates to a language agnostic machine learning model for title standardization.

BACKGROUND

The rise of the Internet has occasioned two disparate phenomena: the increase in the presence of social networks, with their corresponding member profiles visible to large numbers of people, and the increase in the use of these social networks to perform searches for people and companies. It is common for various attributes of member (e.g., person or company) profiles to be standardized based on entities in various taxonomies. For example, an industry may be listed for a company, with the industry being selected from among a number of entries in an industry taxonomy, namely a data structure maintained by the social networking service. This industry taxonomy may include a hierarchical organization of possible industries. For example, an industry category of "Information Technology" in the industry taxonomy may have sub-categories of "Computer Software," "Computer Hardware," and "Computer Networking." The industry taxonomy may organize the sub-categories as children of a parent node corresponding to "Information Technology." There may be many layers of categories and sub-categories in the industry taxonomy.

Industry, of course, is only one example of a member attribute that can be assigned to an entity in a taxonomy. Other examples include job title, school, skills, and so on. One important member attribute often used for the analysis of candidates and careers is job title (or more simply put, just "title"). Standardization of titles can be important for the analysis, as certain titles can sound similar and yet be very different (e.g., "software engineer" is a much different job than a train engineer, which often is just referred to as "engineer").

Additionally, users may come from all over the world and be typing their title in any of a number of different languages. Many models used to standardize titles rely on the ability to break complex titles into individual words that carry meaning. In English, for example, "software engineer" comprises two separate words with each word carrying a different meaning. Other languages do not separate words in this fashion, however. For example, in German the term for "Software Engineer" may be "Softwareentwickler," because German has what are called "compound nouns." Languages such as Chinese have words that are not separated by spaces. Of course, even English can sometimes have compound nouns (e.g., bedroom), but they are much less common in English than other languages.

Using a separate model for each language creates a technical problem in that the data in any given language for a title may be insufficient to provide reliable results. It would therefore be technically advantageous to be able to utilize some aspects learned about terms in one language when attempting to standardize a term in another language.

BRIEF DESCRIPTION OF THE DRAWINGS

Some embodiments of the technology are illustrated, by way of example and not limitation, in the figures of the accompanying drawings.

DETAILED DESCRIPTION

Overview

The present disclosure describes, among other things, methods, systems, and computer program products that individually provide various functionality. In the following description, for purposes of explanation, numerous specific details are set forth in order to provide a thorough understanding of the various aspects of different embodiments of the present disclosure. It will be evident, however, to one skilled in the art, that the present disclosure may be practiced without all of the specific details.

In an example embodiment, a system is provided whereby a machine learning model is trained to predict a standardization for a given raw title. A neural network may be trained whose input is a raw title (such as a query string) and a list of candidate titles (either title identifications in a taxonomy, or English strings), and which produces a probability that the query and each candidate belong to the same title. The model is able to standardize any language included in the training data without first having to perform language identification or normalization of the title. Additionally, the model is able to benefit from the existence of "loan words" (words adopted from a foreign language with little or no modification) and relations between languages.

Because the model only considers "taxonomical" candidates (i.e., title identifications in a taxonomy or canonical (e.g., English) names for a title), it is not necessary for the taxonomy to be complete in any given language. For example, the model is able to learn that a Kaskadeur is a stuntman without having added Kaskadeur as an alias for the German "Stuntman" in the taxonomy. It can be very challenging to find labeled training data, and this problem can be exacerbated by gaps in the taxonomy; hence the ability to learn such relations is quite technically valuable.

No normalization is needed, as such normalization is highly language dependent. In order to simplify matters, all titles may be converted to lowercase, but since that aspect is language-agnostic, the result is that the system need not be aware ahead of time of the languages being fed to the model.

Figure 1:
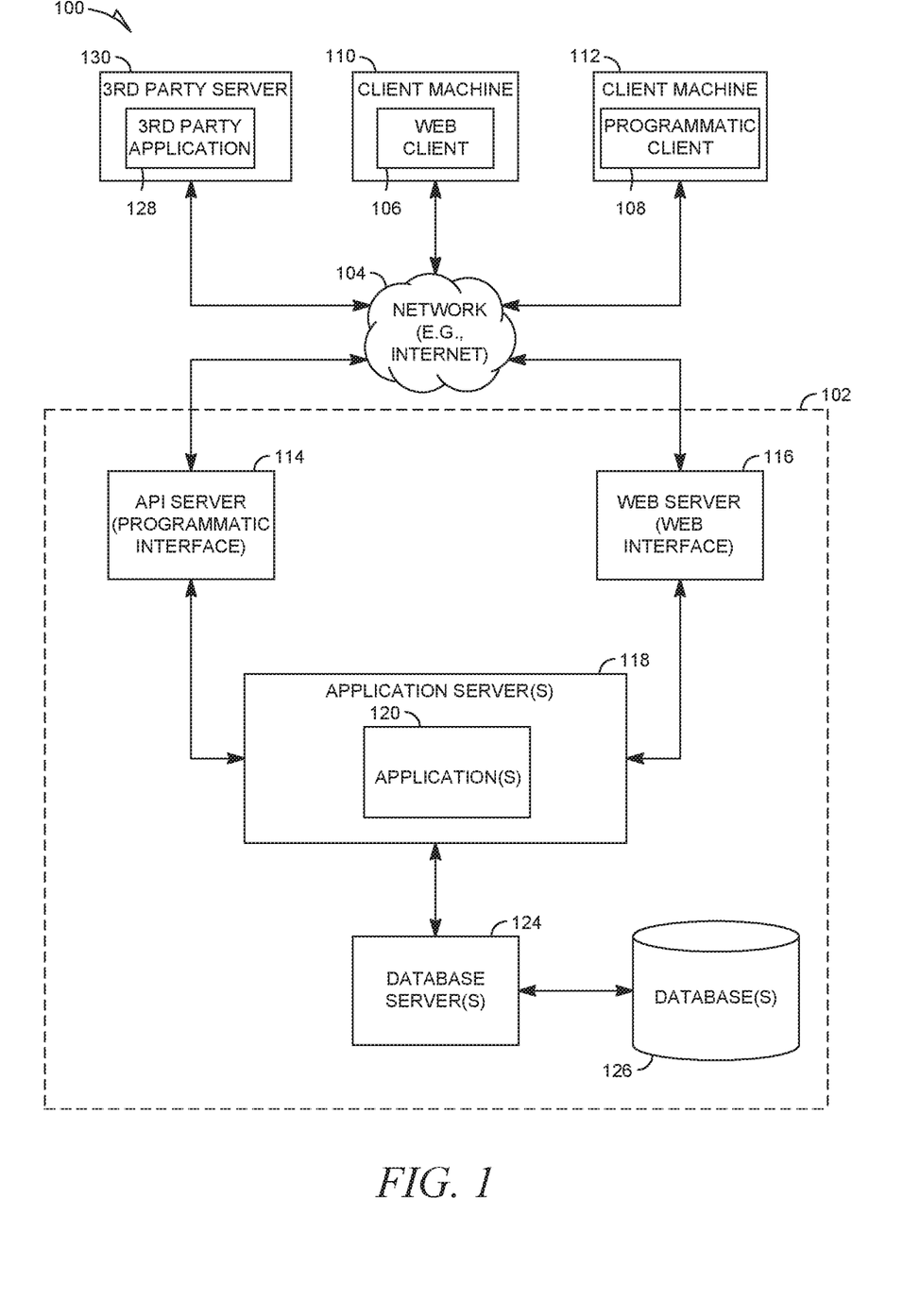
FIG. 1 is a block diagram illustrating a client-server system, in accordance with an example embodiment.

FIG. 1 is a block diagram illustrating a client-server system 100, in accordance with an example embodiment. A networked system 102 provides server-side functionality via a network 104 (e.g., the Internet or a wide area network (WAN)) to one or more clients. FIG. 1 illustrates, for example, a web client 106 (e.g., a browser) and a programmatic client 108 executing on respective client machines 110 and 112.

An application programming interface (API) server 114 and a web server 116 are coupled to, and provide programmatic and web interfaces respectively to, one or more application servers 118. The application server(s) 118 host one or more applications 120. The application server(s) 118 are, in turn, shown to be coupled to one or more database servers 124 that facilitate access to one or more databases 126. While the application(s) 120 are shown in FIG. 1 to form part of the networked system 102, it will be appreciated that, in alternative embodiments, the application(s) 120 may form part of a service that is separate and distinct from the networked system 102.

Further, while the client-server system 100 shown in FIG. 1 employs a client-server architecture, the present disclosure is, of course, not limited to such an architecture, and could equally well find application in a distributed, or peer-to-peer, architecture system, for example. The various applications 120 could also be implemented as standalone software programs, which do not necessarily have networking capabilities.

The web client 106 accesses the various applications 120 via the web interface supported by the web server 116. Similarly, the programmatic client 108 accesses the various services and functions provided by the application(s) 120 via the programmatic interface provided by the API server 114.

FIG. 1 also illustrates a third-party application 128, executing on a third-party server 130, as having programmatic access to the networked system 102 via the programmatic interface provided by the API server 114. For example, the third-party application 128 may, utilizing information retrieved from the networked system 102, support one or more features or functions on a website hosted by a third party. The third-party website may, for example, provide one or more functions that are supported by the relevant applications 120 of the networked system 102.

In some embodiments, any website referred to herein may comprise online content that may be rendered on a variety of devices including, but not limited to, a desktop personal computer (PC), a laptop, and a mobile device (e.g., a tablet computer, smartphone, etc.). In this respect, any of these devices may be employed by a user to use the features of the present disclosure. In some embodiments, a user can use a mobile app on a mobile device (any of the client machines 110, 112 and the third-party server 130 may be a mobile device) to access and browse online content, such as any of the online content disclosed herein. A mobile server (e.g., the API server 114) may communicate with the mobile app and the application server(s) 118 in order to make the features of the present disclosure available on the mobile device.

Figure 2:
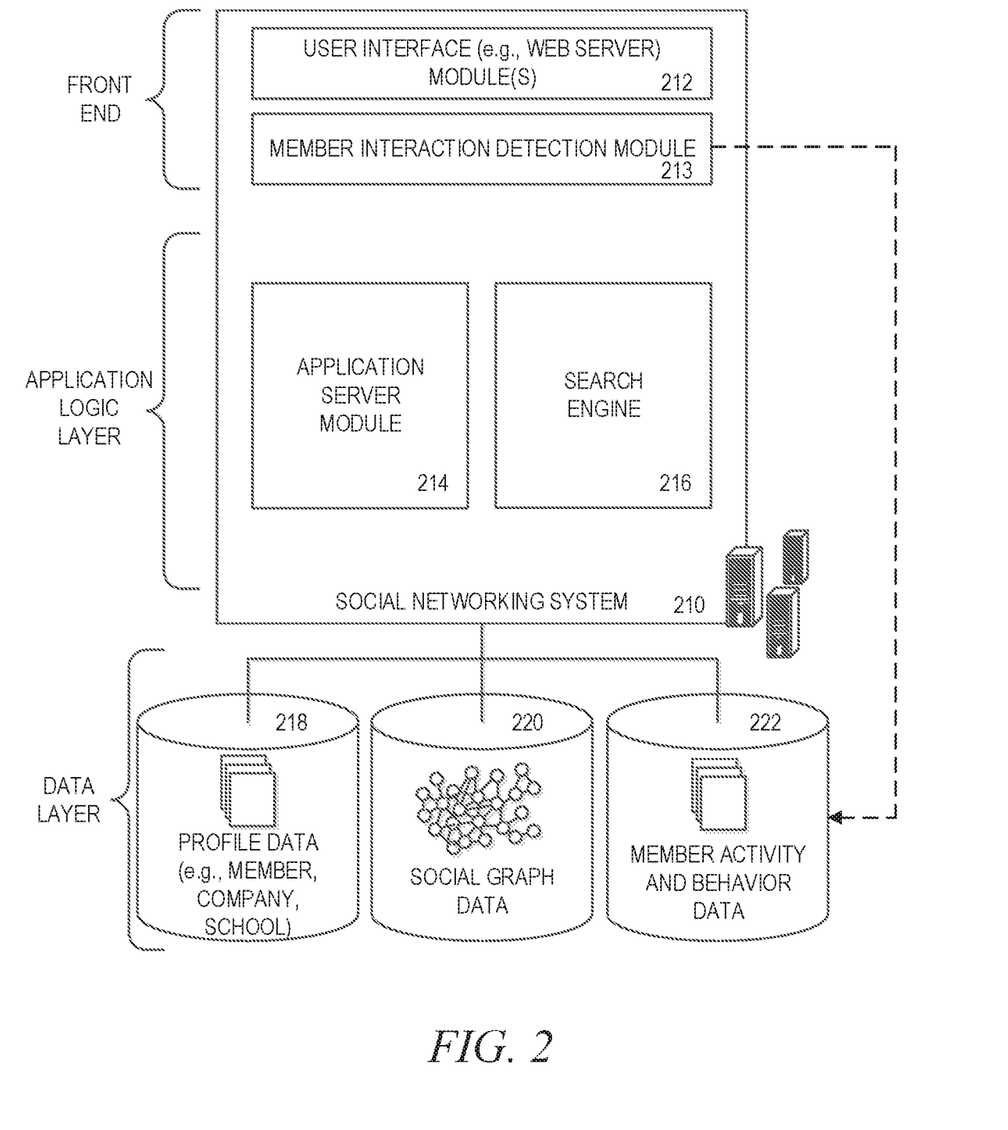
FIG. 2 is a block diagram showing the functional components of a social networking service, including a data processing module referred to herein as a search engine, for use in generating and providing search results for a search query, consistent with some embodiments of the present disclosure.

In some embodiments, the networked system 102 may comprise functional components of a social networking service. FIG. 2 is a block diagram showing the functional components of a social networking service, including a data processing module referred to herein as a search engine 216, for use in generating and providing search results for a search query, consistent with some embodiments of the present disclosure. In some embodiments, the search engine 216 may reside on the application server(s) 118 in FIG. 1. However, it is contemplated that other configurations are also within the scope of the present disclosure.

As shown in FIG. 2, a front end may comprise a user interface module (e.g., a web server 116) 212, which receives requests from various client computing devices and communicates appropriate responses to the requesting client devices. For example, the user interface module(s) 212 may receive requests in the form of Hypertext Transfer Protocol (HTTP) requests or other web-based API requests. In addition, a member interaction detection module 213 may be provided to detect various interactions that members have with the different applications 120, services, and content presented. As shown in FIG. 2, upon detecting a particular interaction, the member interaction detection module 213 logs the interaction, including the type of interaction and any metadata relating to the interaction, in a member activity and behavior database 222.

An application logic layer may include one or more various application server modules 214, which, in conjunction with the user interface module(s) 212, generate various user interfaces (e.g., web pages) with data retrieved from various data sources in a data layer. In some embodiments, individual application server modules 214 are used to implement the functionality associated with various applications 120 and/or services provided by the social networking service.

As shown in FIG. 2, the data layer may include several databases, such as a profile database 218 for storing profile data, including both member profile data and profile data for various organizations (e.g., companies, schools, etc.). Consistent with some embodiments, when a person initially registers to become a member of the social networking service, the person will be prompted to provide some personal information, such as his or her name, age (e.g., birth date), gender, interests, contact information, home town, address, spouse's and/or family members' names, educational background (e.g., schools, majors, matriculation and/or graduation dates, etc.), employment history, skills, professional organizations, and so on. This information is stored, for example, in the profile database 218. Similarly, when a representative of an organization initially registers the organization with the social networking service, the representative may be prompted to provide certain information about the organization. This information may be stored, for example, in the profile database 218, or another database (not shown). In some embodiments, the profile data may be processed (e.g., in the background or offline) to generate various derived profile data. For example, if a member has provided information about various job titles that the member has held with the same organization or different organizations, and for how long, this information can be used to infer or derive a member profile attribute indicating the member's overall seniority level, or seniority level within a particular organization. In some embodiments, importing or otherwise accessing data from one or more externally hosted data sources may enrich profile data for both members and organizations. For instance, with organizations in particular, financial data may be imported from one or more external data sources and made part of an organization's profile. This importation of organization data and enrichment of the data will be described in more detail later in this document.

Once registered, a member may invite other members, or be invited by other members, to connect via the social networking service. A "connection" may constitute a bilateral agreement by the members, such that both members acknowledge the establishment of the connection. Similarly, in some embodiments, a member may elect to "follow" another member. In contrast to establishing a connection, "following" another member typically is a unilateral operation and, at least in some embodiments, does not require acknowledgement or approval by the member who is being followed. When one member follows another, the member who is following may receive status updates (e.g., in an activity or content stream) or other messages published by the member being followed, or relating to various activities undertaken by the member being followed. Similarly, when a member follows an organization, the member becomes eligible to receive messages or status updates published on behalf of the organization. For instance, messages or status updates published on behalf of an organization that a member is following will appear in the member's personalized data feed, commonly referred to as an activity stream or content stream. In any case, the various associations and relationships that the members establish with other members, or with other entities and objects, are stored and maintained within a social graph in a social graph database 220.

As members interact with the various applications 120, services, and content made available via the social networking service, the members' interactions and behavior (e.g., content viewed, links or buttons selected, messages responded to, etc.) may be tracked, and information concerning the members' activities and behavior may be logged or stored, for example, as indicated in FIG. 2, by the member activity and behavior database 222. This logged activity information may then be used by the search engine 216 to determine search results for a search query.

In some embodiments, the databases 218, 220, and 222 may be incorporated into the database(s) 126 in FIG. 1. However, other configurations are also within the scope of the present disclosure.

Although it is not shown, in some embodiments, the social networking system 210 provides an API module via which applications 120 and services can access various data and services provided or maintained by the social networking service. For example, using an API, an application 120 may be able to request and/or receive one or more navigation recommendations. Such applications 120 may be browser-based applications 120, or may be operating system-specific. In particular, some applications 120 may reside and execute (at least partially) on one or more mobile devices (e.g., phone or tablet computing devices) with a mobile operating system. Furthermore, while in many cases the applications 120 or services that leverage the API may be applications 120 and services that are developed and maintained by the entity operating the social networking service, nothing other than data privacy concerns prevents the API from being provided to the public or to certain third parties under special arrangements, thereby making the navigation recommendations available to third-party applications 128 and services.

Although the search engine 216 is referred to herein as being used in the context of a social networking service, it is contemplated that it may also be employed in the context of any website or online services. Additionally, although features of the present disclosure are referred to herein as being used or presented in the context of a web page, it is contemplated that any user interface view (e.g., a user interface on a mobile device or on desktop software) is within the scope of the present disclosure.

In an example embodiment, when member profiles are indexed, forward search indexes are created and stored. The search engine 216 facilitates the indexing of and searching for content within the social networking service, such as the indexing of and searching for data or information contained in the data layer, such as profile data (stored, e.g., in the profile database 218), social graph data (stored, e.g., in the social graph database 220), and member activity and behavior data (stored, e.g., in the member activity and behavior database 222). The search engine 216 may collect, parse, and/or store data in an index or other similar structure to facilitate the identification and retrieval of information in response to received queries for information. This may include, but is not limited to, forward search indexes, inverted indexes, N-gram indexes, and so on.

Figure 3:
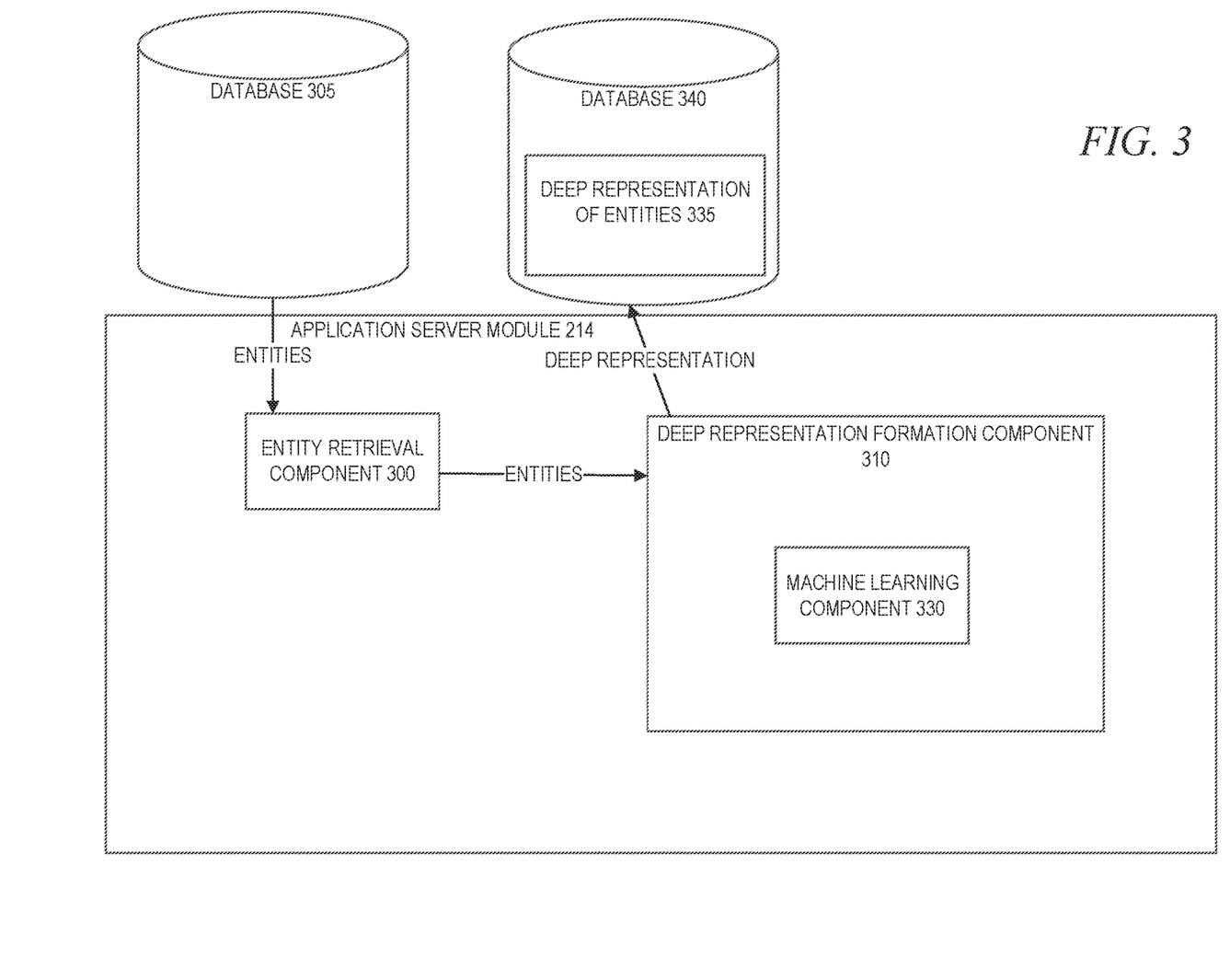
FIG. 3 is a block diagram illustrating an application server module in more detail, in accordance with an example embodiment.

FIG. 3 is a block diagram illustrating the application server module 214 of FIG. 2 in more detail. While in many embodiments the application server module 214 will contain many subcomponents used to perform various different actions within the social networking system 210, in FIG. 3 only those components that are relevant to the present disclosure are depicted. Here, an entity retrieval component 300 retrieves entities from a database 305. This may include, for example, importing existing taxonomies. The entities, once extracted, are passed to a deep representation formation component 310, which acts to form a deep representation of the entities 335, as will be described in more detail later. This may include utilizing a machine learning component 330. Once formed, the deep representation of the entities 335 may be stored in a database 340. In some example embodiments, the database 305 and the database 340 are a single database.

In an example embodiment, every entity that could be mapped to a taxonomy in a social network may be mapped to a vector (a point in an arbitrary space). This mapping may be known as an embedding. The vector may include any number of dimensions. In an example embodiment, each entity is embedded to a vector having 128 dimensions. This means that every entity is mapped to a set of 128 coordinates. "Arbitrary" means that each dimension has no meaning in itself; they are simply a mechanism by which distance between entities may be measured. The specific starting values for each vector may be randomly assigned, and through a machine learning optimization process the starting values may be altered repeatedly until a particular objective is optimized. It should be noted that it may be desirable to select at least as many dimensions as there are objectives to solve for; however, this is not a requirement.

It should be noted that an entity as described herein is a specific instance of standardized data in the social network. Typically these entities will include pieces of data supplied in a member profile that are capable of being standardized. Common entities in social networking profiles include titles, industries, locations, skills, likes, dislikes, schools attended, etc. Certain types of data are less likely to be capable of being standardized, such as names, publications, etc.

In an example embodiment, one or more machine learning algorithms are used to aid in optimizing embedding used in the deep representation of entities. Some of the models trained via these machine learning algorithms may apply generally to any type of entity, while others may apply to specific types of entities. For purposes of the present document, only the machine learning algorithm used to train a machine learned model to standardize titles will be described.

Figure 4:
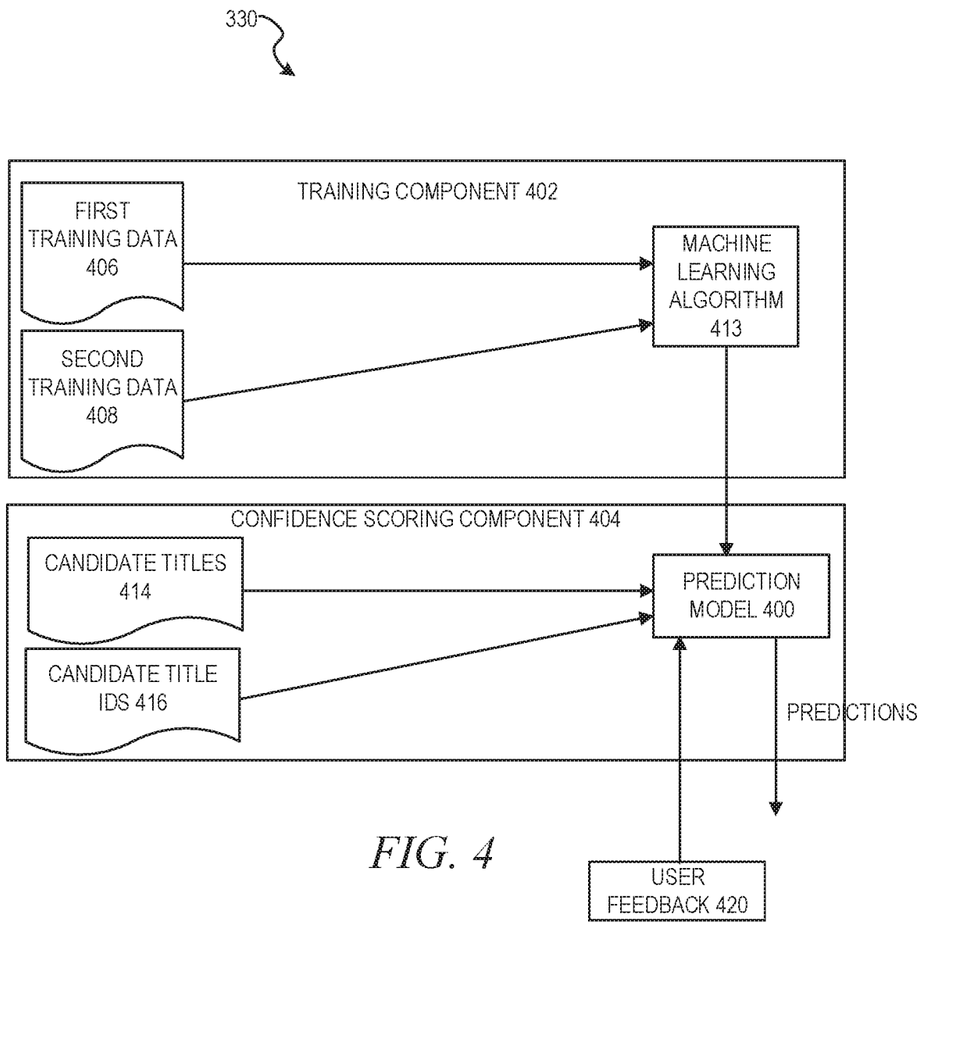
FIG. 4 is a block diagram illustrating a machine learning component in more detail, in accordance with an example embodiment.

FIG. 4 is a block diagram illustrating a machine learning component 330 in more detail, in accordance with an example embodiment. The machine learning component 330 may utilize machine learning processes to arrive at a prediction model 400 used to provide a confidence score for a particular prediction. The exact prediction may vary based on the objective being selected. The machine learning component 330 may comprise a training component 402 and a confidence scoring component 404. The training component 402 feeds first training data 406 comprising, for example, labeled pairs of raw titles and title identifications into a machine learning algorithm 413, which produces the prediction model 400. In some example embodiments, this involves the machine learning algorithm 413 learning weights to apply in the prediction model 400. Later, second training data 408 may also be fed into the machine learning algorithm 413 to retrain the prediction model 400. The second training data 408 may comprise, for example, labeled pairs of raw titles and skills. In the confidence scoring component 404, one or more candidate titles 414, as well as one or more candidate title identifications 416, may be fed to the prediction model 400, which outputs a confidence score for each of one or more potential predictions, indicating a confidence level in the corresponding potential prediction.

It should be noted that the prediction model 400 may be periodically updated via additional training and/or user feedback 420. The user feedback 420 may be feedback either from members performing searches or from administrators. The user feedback 420 may include an indication of how successful the prediction model 400 is in providing accurate confidence scores.

The machine learning algorithm 413 may be selected from among many different potential supervised or unsupervised machine learning algorithms. Examples of supervised learning algorithms include artificial neural networks, Bayesian networks, instance-based learning, support vector machines, random forests, linear classifiers, quadratic classifiers, k-nearest neighbor, decision trees, and hidden Markov models. Examples of unsupervised learning algorithms include expectation-maximization algorithms, vector quantization, and information bottleneck methods. In an example embodiment, a multi-class logistical regression model is used.

As described above, the training component 402 may operate in an offline manner to train the prediction model 400. The confidence scoring component 404, however, may be designed to operate in either an offline manner or an online manner.

The first training data 406 may be labeled training data. This labeled training data may be obtained from the taxonomy itself (as a mapping of titles to title identifications), bilingual member profiles, machine translations, and titles similar to taxonomical strings. Bilingual profiles are profiles of members that have been created in multiple languages (typically by the member themself). These translations are generally of high quality. Machine translations are the output of feeding a selection of titles in one language into a machine translator to translate them into another language. For titles similar to taxonomical strings, this is intended to catch small spelling mistakes or trailing letters. As such, each title can be broken into a set of tri-letter-grams, and then the intersection between this raw title and every title in the taxonomy can be found. An intersection over union score can be computed for each pair. For example:

$A$=intersection_size/query_string_set_size $B$=intersection_size/candidate_string_set_size Score=*$A*B/(2A+B)$ (asymmetry between A and B is intentional)

Additionally, title-skill pairs may also be used. A title-skill pair is a mapping between a particular raw title and a skill or skill identification. In that manner, for example, the skill of Java may be associated with the title "software engineer." Members' current titles and explicit skills can be sampled to obtain this data. These title-skill pairs are added as extra input, and learning which skills are associated with each title allows the machine learning algorithm to adjust the raw title/title identification embeddings so that functionally related titles are standardized to the same title identification, without the titles necessarily being similar at a string level.

The basic design of the prediction model 400 is to take a query string (e.g., raw title) and a list of candidates (e.g., taxonomy titles), represent each title as a vector, and then compare the query vector with each candidate to produce a score, with the highest-scoring candidate being the one that the raw title is standardized to.

In an example embodiment, a convolutional neural network may be used to determine the query and candidate representations.

The vectorization of the raw titles may be accomplished by padding all strings with # to an arbitrary length and then breaking each raw title into a sequence of tri-letter-grams. For example, "architect" may be padded to "#architect####" which then may be turned into tri-letter grams (#ar, arc, rch, chi, hit, ite, tec, ect, ct#, t##, ###, . . . ). In some implementations, however, this can cause a processing bottleneck and drastically limited graphical processing unit (GPU) utilization. In order to remedy this bottleneck, hashing of individual characters may be performed instead, on the supposition that the information carried by character co-location would be captured by convolutions with a window of (1, 3).

Figure 5:
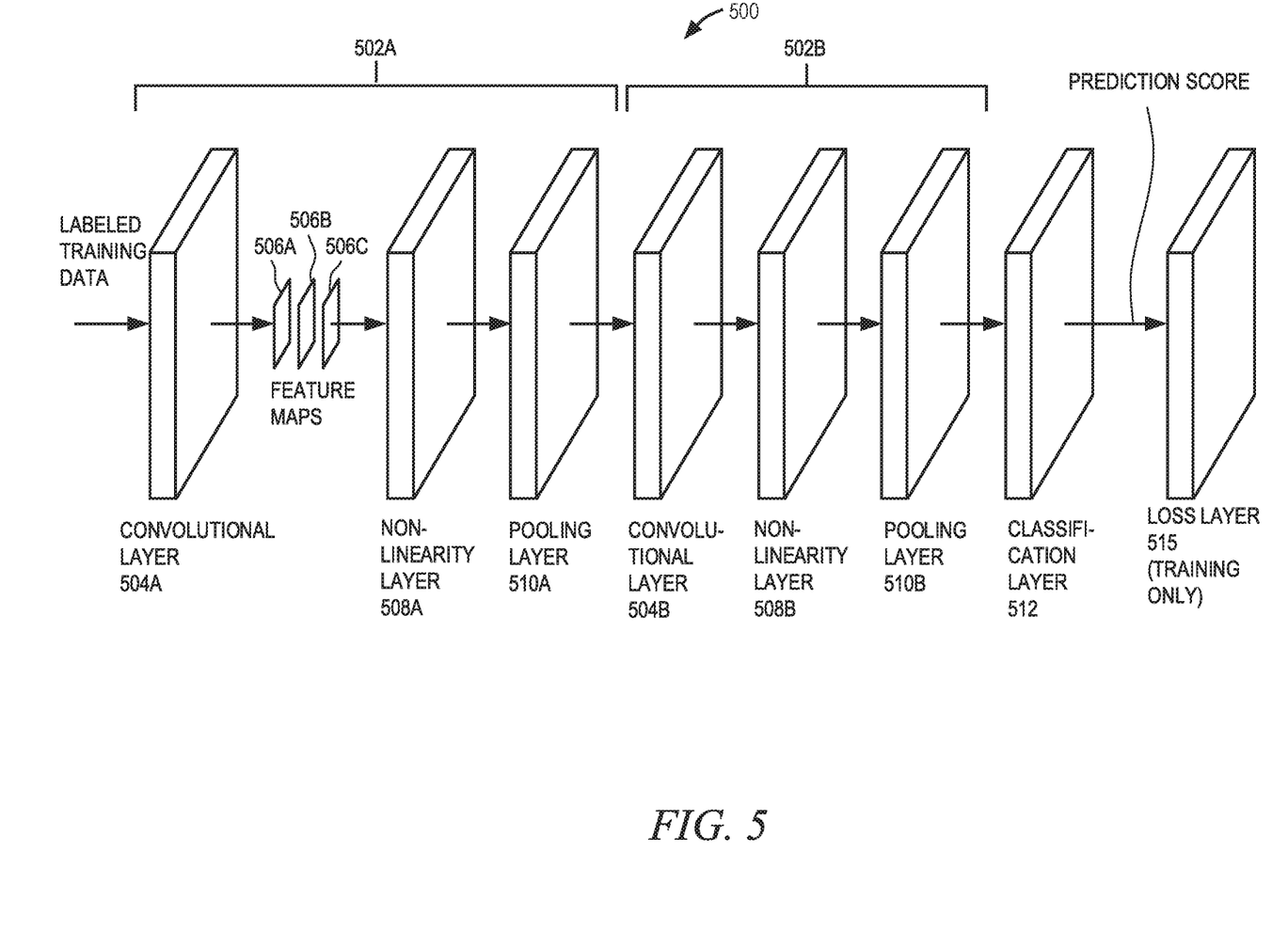
FIG. 5 is a diagram illustrating a deep convolutional neural network (DCNN), in accordance with an example embodiment.

Turning now to the machine learning algorithm 413, in an example embodiment, five different types of layers are utilized. The first four layers are the convolutional layer, the nonlinearity layer, the pooling layer, and the classification layer (although the classification is just a special case of convolution followed by "softmax"), making the machine learning algorithm 413 a deep convolutional neural network (DCNN). These first four layers may be considered to be a stage, and the DCNN may actually be designed to have any number of these stages. Once the stages are all complete, a loss layer is used. FIG. 5 is a diagram illustrating a DCNN 500, in accordance with an example embodiment. Here, two stages 502A, 502B are depicted.

Convolutional layers 504A, 504B are the core of the DCNN 500. Their parameters include a set of learnable filters. During a forward pass in a convolutional layer 504A, 504B, each filter is convolved across the input vectors. As a result, the DCNN 500 learns filters that activate when they see some pattern.

The feature maps for all filters can be stacked along the depth dimension to form the full volume output of the convolutional layers 504A, 504B.

The convolutional layers 504A, 504B apply mathematical operations called convolutionals.

It should be noted that the filters used in the convolutional layers 504A, 504B may be activated in a first iteration of the DCNN 500 and refined prior to each additional iteration, based on actions taken in other layers in the previous iteration, until some error term is minimized below a particular threshold. In one example embodiment, this may be accomplished through back propagation, which is described in more detail below.

The output of the convolutional layers 504A, 504B are sets of arrays called feature maps 506A-506C. Each feature map 506A-506C may be produced by a different filter and modified based on various functions in each stage. At the output, each feature map 506A-506C represents a particular feature extracted at all locations on the input and conditioned. The example in FIG. 5 is of a two-stage system, although one of ordinary skill in the art will recognize that more or fewer stages could be used while still being consistent with the present disclosure, and indeed as will be seen in an example embodiment, the number of stages may be dynamically determined at runtime to optimize results.

Nonlinearity layers 508A, 508B give the DCNN 500 greater expressive power in uncovering nonlinear relationships between input and output. Many different nonlinearities could be used in the nonlinearity layers 508A, 508B, including sigmoid, tanh, and rectified linear functions. For brevity, one example of nonlinearity will be described here: the rectified linear function. This function is defined by the following:

$$y(x) = \begin{cases} x \text{ if } x > 0 \\ 0 \text{ if } x < 0 \end{cases}$$

Pooling layers 510A, 510B are applied to reduce the input vector dimensions while preserving some information from the input. In other words, the pooling layers 510A, 510B do not actually do any of the learning; i.e., they are a fixed predefined operation that doesn't change as training progresses, but instead they are used to reduce the dimensions of the problem. In one example embodiment, a decimation approach could be followed, where one out of every N samples along a dimension is kept out. In another example embodiment, some local statistics may be used for pooling, such as max pooling, defined as:

$$Y[n, m, d] = \max_{|n'| < N, |m'| < M} x[n + n', m + m', d]$$

where N=M=2.

When all the stages 502A, 502B are complete, a classification layer 512 is used to calculate a precise prediction score indicating the likelihood that an input vector matches a particular standardized title identification, using the output of the final pooling layer 510B. In an example embodiment, the classification layer 512 is actually a specialized convolutional layer containing a filter designed to produce the prediction score from the volume output of the final pooling layer 510B. This filter applies a classification function having weights that may be refined in the same manner as the weights in the functions of the filters of the normal convolutional layers 504A, 504B.

Back propagation involves calculating a gradient of a loss function in a loss layer 515, with respect to a number of weights in the DCNN 500. The gradient is then fed to a method that updates the weights for the next iteration of the training of the DCNN 500 in an attempt to minimize the loss function, which uses a different set of training data. Back propagation uses the labeled training data that have been passed through the stages 502A, 502B in order to calculate the loss function gradient for the samples as a group.

Back propagation may include two aspects: propagation and weight update. In the propagation aspect, forward propagation of a training pattern's input images is performed through the DCNN 500 in order to generate the propagation's output activations (i.e., the vectors are passed through the stages 502A, 502B). Then, backward propagation of the propagation's output activations is performed through the DCNN 502 using a target specified by the training pattern in order to generate the deltas of all output.

In the weight update aspect, for each weight of each filter, the output delta and input activation are multiplied to obtain the gradient of the weight, and then a ratio of the gradient is subtracted from the weight. The ratio influences speed and quality of learning. The higher the ratio, the faster the training, but at the expense of accuracy.

Thus, these two aspects, including both the forward pass and the backward pass through the stages 502A, 502B, are performed repeatedly until the error rate is below a particular threshold. Back propagation algorithms compatible with the DCNN 500 include, for example, gradient descent.

The use of the back propagation may be predicated on whether or not the combined error of the classification of the vectors in the batch of labeled training data transgresses a preset error threshold. If the combined error is too great, then back propagation should occur to update and minimize the error for the next iteration, and a next iteration may be performed with a subsequent batch of labeled training data, until the combined error does not transgress the threshold.

Figure 6:
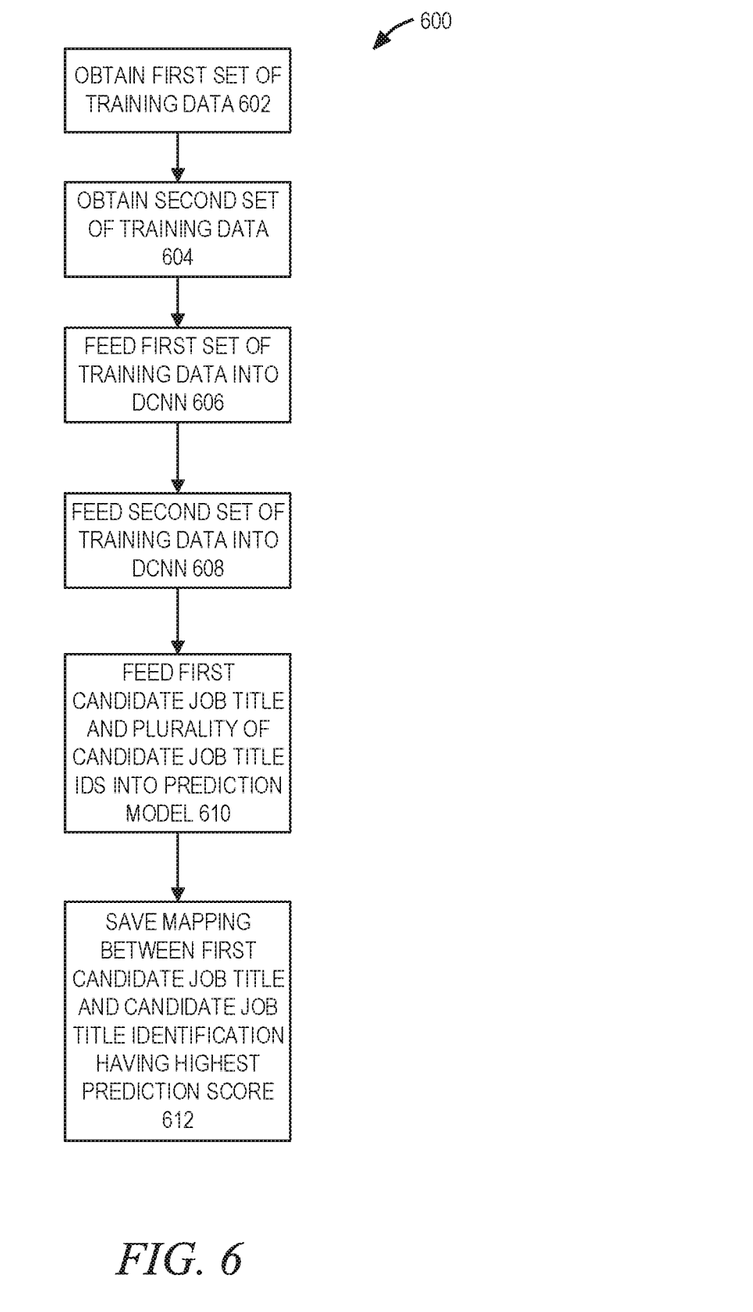
FIG. 6 is a flow diagram illustrating a method in accordance with an example embodiment.

FIG. 6 is a flow diagram illustrating a method 600 in accordance with an example embodiment. At operation 602, a first set of training data is obtained. The first set of training data comprises pairs of job titles and standardized job title identifications. At operation 604, a second set of training data is obtained. The second set of training data comprises pairs of job titles and skills. At operation 606, the first set of training data is fed into a DCNN designed to train a prediction model to output a prediction score indicating a likelihood that an input candidate job title matches an input job title identification. At operation 608, the second set of training data is fed into the DCNN in order to retrain the prediction model.

At runtime, at operation 610, a first candidate job title and a plurality of candidate job title identifications are fed into the prediction model, producing a prediction score for each pairing of the first candidate job title and a candidate job title identification. At operation 612, a mapping between the first candidate job title and a candidate job title identification from the plurality of candidate job title identifications having a highest prediction score is saved.

Figure 7:
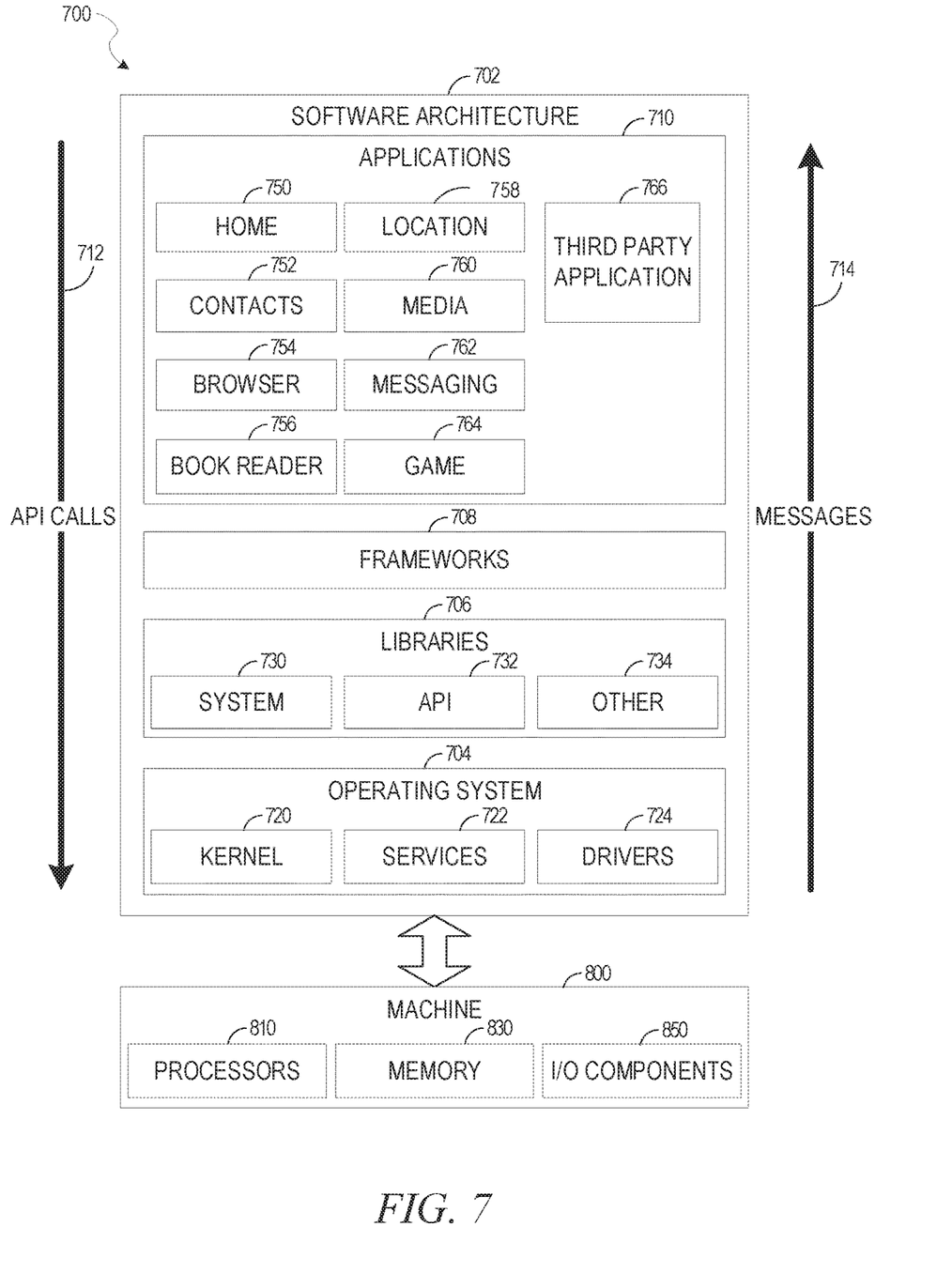
FIG. 7 is a block diagram illustrating an architecture of software, which can be installed on any one or more of the devices described above.

FIG. 7 is a block diagram 700 illustrating a software architecture 702, which can be installed on any one or more of the devices described above. FIG. 7 is merely a non-limiting example of a software architecture, and it will be appreciated that many other architectures can be implemented to facilitate the functionality, described herein. In various embodiments, the software architecture 702 is implemented by hardware such as a machine 800 of FIG. 8 that includes processors 810, memory 830, and input/output (I/O) components 850. In this example architecture, the software architecture 702 can be conceptualized as a stack of layers where each layer may provide a particular functionality. For example, the software architecture 702 includes layers such as an operating system 704, libraries 706, frameworks 708, and applications 710. Operationally, the applications 710 invoke API calls 712 through the software stack and receive messages 714 in response to the API calls 712, consistent with some embodiments.

In various implementations, the operating system 704 manages hardware resources and provides common services. The operating system 704 includes, for example, a kernel 720, services 722, and drivers 724. The kernel 720 acts as an abstraction layer between the hardware and the other software layers, consistent with some embodiments. For example, the kernel 720 provides memory management, processor management (e.g., scheduling), component management, networking, and security settings, among other functionality. The services 722 can provide other common services for the other software layers. The drivers 724 are responsible for controlling or interfacing with the underlying hardware, according to some embodiments. For instance, the drivers 724 can include display drivers, camera drivers, BLUETOOTH® or BLUETOOTH® Low Energy drivers, flash memory drivers, serial communication drivers (e.g., Universal Serial Bus (USB) drivers), Wi-Fi® drivers, audio drivers, power management drivers, and so forth.

In some embodiments, the libraries 706 provide a low-level common infrastructure utilized by the applications 710. The libraries 706 can include system libraries 730 (e.g., C standard library) that can provide functions such as memory allocation functions, string manipulation functions, mathematic functions, and the like. In addition, the libraries 706 can include API libraries 732 such as media libraries (e.g., libraries to support presentation and manipulation of various media formats such as Moving Picture Experts Group-4 (MPEG4), Advanced Video Coding (H.264 or AVC), Moving Picture Experts Group Layer-3 (MP3), Advanced Audio Coding (AAC), Adaptive Multi-Rate (AMR) audio codec, Joint Photographic Experts Group (JPEG or JPG), or Portable Network Graphics (PNG)), graphics libraries (e.g., an OpenGL framework used to render in two dimensions (2D) and three dimensions (3D) in a graphic context on a display), database libraries (e.g., SQLite to provide various relational database functions), web libraries (e.g., WebKit to provide web browsing functionality), and the like. The libraries 706 can also include a wide variety of other libraries 734 to provide many other APIs to the applications 710.

The frameworks 708 provide a high-level common infrastructure that can be utilized by the applications 710, according to some embodiments. For example, the frameworks 708 provide various graphic user interface (GUI) functions, high-level resource management, high-level location services, and so forth. The frameworks 708 can provide a broad spectrum of other APIs that can be utilized by the applications 710, some of which may be specific to a particular operating system 704 or platform.

In an example embodiment, the applications 710 include a home application 750, a contacts application 752, a browser application 754, a book reader application 756, a location application 758, a media application 760, a messaging application 762, a game application 764, and a broad assortment of other applications such as a third-party application 766. According to some embodiments, the applications 710 are programs that execute functions defined in the programs. Various programming languages can be employed to create one or more of the applications 710, structured in a variety of manners, such as object-oriented programming languages (e.g., Objective-C, Java, or C++) or procedural programming languages (e.g., C or assembly language). In a specific example, the third-party application 766 (e.g., an application developed using the ANDROID™ or IOS™ software development kit (SDK) by an entity other than the vendor of the particular platform) may be mobile software running on a mobile operating system such as IOS™, ANDROID™, WINDOWS® Phone, or another mobile operating system. In this example, the third-party application 766 can invoke the API calls 712 provided by the operating system 704 to facilitate functionality described herein.

Figure 8:
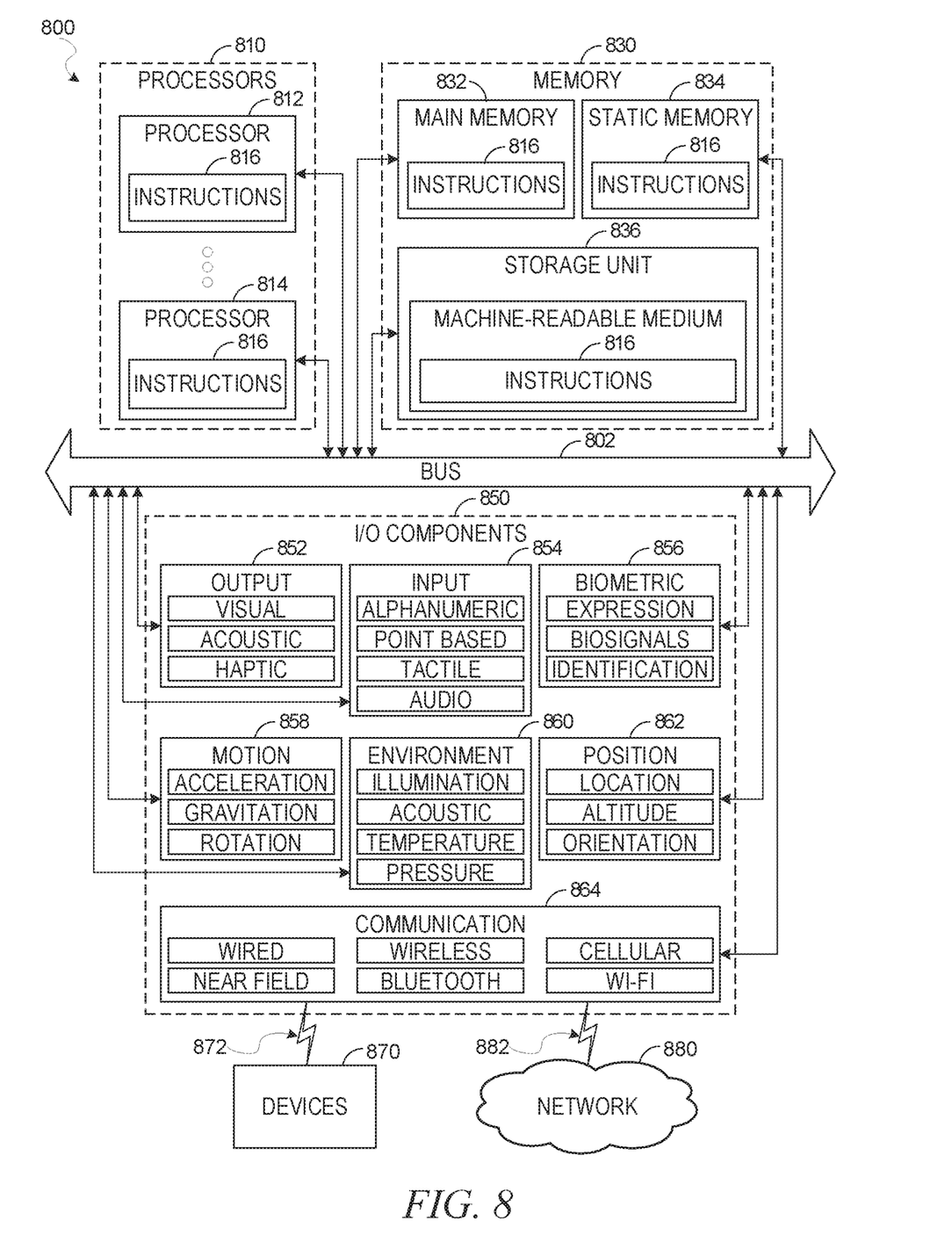
FIG. 8 illustrates a diagrammatic representation of a machine in the form of a computer system within which a set of instructions may be executed for causing the machine to perform any one or more of the methodologies discussed herein, according to an example embodiment.

FIG. 8 illustrates a diagrammatic representation of a machine 800 in the form of a computer system within which a set of instructions may be executed for causing the machine 800 to perform any one or more of the methodologies discussed herein, according to an example embodiment. Specifically, FIG. 8 shows a diagrammatic representation of the machine 800 in the example form of a computer system, within which instructions 816 (e.g., software, a program, an application 710, an applet, an app, or other executable code) for causing the machine 800 to perform any one or more of the methodologies discussed herein may be executed. For example, the instructions 816 may cause the machine 800 to execute the method 600 of FIG. 6. Additionally, or alternatively, the instructions 816 may implement FIGS. 1-7, and so forth. The instructions 816 transform the general, non-programmed machine 800 into a particular machine 800 programmed to carry out the described and illustrated functions in the manner described. In alternative embodiments, the machine 800 operates as a standalone device or may be coupled (e.g., networked) to other machines. In a networked deployment, the machine 800 may operate in the capacity of a server machine or a client machine in a server-client network environment, or as a peer machine in a peer-to-peer (or distributed) network environment. The machine 800 may comprise, but not be limited to, a server computer, a client computer, a PC, a tablet computer, a laptop computer, a netbook, a set-top box (STB), a portable digital assistant (PDA), an entertainment media system, a cellular telephone, a smartphone, a mobile device, a wearable device (e.g., a smart watch), a smart home device (e.g., a smart appliance), other smart devices, a web appliance, a network router, a network switch, a network bridge, or any machine capable of executing the instructions 816, sequentially or otherwise, that specify actions to be taken by the machine 800. Further, while only a single machine 800 is illustrated, the term "machine" shall also be taken to include a collection of machines 800 that individually or jointly execute the instructions 816 to perform any one or more of the methodologies discussed herein.

The machine 800 may include processors 810, memory 830, and I/O components 850, which may be configured to communicate with each other such as via a bus 802. In an example embodiment, the processors 810 (e.g., a central processing unit (CPU), a reduced instruction set computing (RISC) processor, a complex instruction set computing (CISC) processor, a graphics processing unit (GPU), a digital signal processor (DSP), an application-specific integrated circuit (ASIC), a radio-frequency integrated circuit (RFIC), another processor, or any suitable combination thereof) may include, for example, a processor 812 and a processor 814 that may execute the instructions 816. The term "processor" is intended to include multi-core processors that may comprise two or more independent processors (sometimes referred to as "cores") that may execute instructions 816 contemporaneously. Although FIG. 8 shows multiple processors 810, the machine 800 may include a single processor with a single core, a single processor with multiple cores (e.g., a multi-core processor), multiple processors with a single core, multiple processors with multiple cores, or any combination thereof.

The memory 830 may include a main memory 832, a static memory 834, and a storage unit 836, all accessible to the processors 810 such as via the bus 802. The main memory 832, the static memory 834, and the storage unit 836 store the instructions 816 embodying any one or more of the methodologies or functions described herein. The instructions 816 may also reside, completely or partially, within the main memory 832, within the static memory 834, within the storage unit 836, within at least one of the processors 810 (e.g., within the processor's cache memory), or any suitable combination thereof, during execution thereof by the machine 800.

The I/O components 850 may include a wide variety of components to receive input, provide output, produce output, transmit information, exchange information, capture measurements, and so on. The specific I/O components 850 that are included in a particular machine 800 will depend on the type of machine 800. For example, portable machines such as mobile phones will likely include a touch input device or other such input mechanisms, while a headless server machine will likely not include such a touch input device. It will be appreciated that the I/O components 850 may include many other components that are not shown in FIG. 8. The I/O components 850 are grouped according to functionality merely for simplifying the following discussion, and the grouping is in no way limiting. In various example embodiments, the I/O components 850 may include output components 852 and input components 854. The output components 852 may include visual components (e.g., a display such as a plasma display panel (PDP), a light-emitting diode (LED) display, a liquid crystal display (LCD), a projector, or a cathode ray tube (CRT)), acoustic components (e.g., speakers), haptic components (e.g., a vibratory motor, resistance mechanisms), other signal generators, and so forth. The input components 854 may include alphanumeric input components (e.g., a keyboard, a touch screen configured to receive alphanumeric input, a photo-optical keyboard, or other alphanumeric input components), point-based input components (e.g., a mouse, a touchpad, a trackball, a joystick, a motion sensor, or another pointing instrument), tactile input components (e.g., a physical button, a touch screen that provides location and/or force of touches or touch gestures, or other tactile input components), audio input components (e.g., a microphone), and the like.

In further example embodiments, the I/O components 850 may include biometric components 856, motion components 858, environmental components 860, or position components 862, among a wide array of other components. For example, the biometric components 856 may include components to detect expressions (e.g., hand expressions, facial expressions, vocal expressions, body gestures, or eye tracking), measure biosignals (e.g., blood pressure, heart rate, body temperature, perspiration, or brain waves), identify a person (e.g., voice identification, retinal identification, facial identification, fingerprint identification, or electroencephalogram-based identification), and the like. The motion components 858 may include acceleration sensor components (e.g., accelerometer), gravitation sensor components, rotation sensor components (e.g., gyroscope), and so forth. The environmental components 860 may include, for example, illumination sensor components (e.g., photometer), temperature sensor components (e.g., one or more thermometers that detect ambient temperature), humidity sensor components, pressure sensor components (e.g., barometer), acoustic sensor components (e.g., one or more microphones that detect background noise), proximity sensor components (e.g., infrared sensors that detect nearby objects), gas sensors (e.g., gas detection sensors to detect concentrations of hazardous gases for safety or to measure pollutants in the atmosphere), or other components that may provide indications, measurements, or signals corresponding to a surrounding physical environment. The position components 862 may include location sensor components (e.g., a Global Positioning System (GPS) receiver component), altitude sensor components (e.g., altimeters or barometers that detect air pressure from which altitude may be derived), orientation sensor components (e.g., magnetometers), and the like.

Communication may be implemented using a wide variety of technologies. The I/O components 850 may include communication components 864 operable to couple the machine 800 to a network 880 or devices 870 via a coupling 882 and a coupling 872, respectively. For example, the communication components 864 may include a network interface component or another suitable device to interface with the network 880. In further examples, the communication components 864 may include wired communication components, wireless communication components, cellular communication components, near field communication (NFC) components, Bluetooth® components (e.g., Bluetooth® Low Energy), Wi-Fi® components, and other communication components to provide communication via other modalities. The devices 870 may be another machine or any of a wide variety of peripheral devices (e.g., a peripheral device coupled via a USB).

Moreover, the communication components 864 may detect identifiers or include components operable to detect identifiers. For example, the communication components 864 may include radio frequency identification (RFID) tag reader components, NFC smart tag detection components, optical reader components (e.g., an optical sensor to detect one-dimensional bar codes such as Universal Product Code (UPC) bar code, multi-dimensional bar codes such as Quick Response (QR) code, Aztec code, Data Matrix, Dataglyph, MaxiCode, PDF417, Ultra Code, UCC RSS-2D bar code, and other optical codes), or acoustic detection components (e.g., microphones to identify tagged audio signals). In addition, a variety of information may be derived via the communication components 864, such as location via Internet Protocol (IP) geolocation, location via Wi-Fi® signal triangulation, location via detecting an NFC beacon signal that may indicate a particular location, and so forth.

Executable Instructions and Machine-Storage Medium

The various memories (i.e., 830, 832, 834, and/or memory of the processor(s) 810) and/or the storage unit 836 may store one or more sets of instructions 816 and data structures (e.g., software) embodying or utilized by any one or more of the methodologies or functions described herein. These instructions (e.g., the instructions 816), when executed by the processor(s) 810, cause various operations to implement the disclosed embodiments.

As used herein, the terms "machine-storage medium," "device-storage medium," and "computer-storage medium" mean the same thing and may be used interchangeably. The terms refer to a single or multiple storage devices and/or media (e.g., a centralized or distributed database, and/or associated caches and servers) that store executable instructions 816 and/or data. The terms shall accordingly be taken to include, but not be limited to, solid-state memories, and optical and magnetic media, including memory internal or external to the processors 810. Specific examples of machine-storage media, computer-storage media, and/or device-storage media include non-volatile memory, including by way of example semiconductor memory devices, e.g., erasable programmable read-only memory (EPROM), electrically erasable programmable read-only memory (EEPROM), field-programmable gate array (FPGA), and flash memory devices; magnetic disks such as internal hard disks and removable disks; magneto-optical disks; and CD-ROM and DVD-ROM disks. The terms "machine-storage media,"

"computer-storage media," and "device-storage media" specifically exclude carrier waves, modulated data signals, and other such media, at least some of which are covered under the term "transmission medium" discussed below.

Transmission Medium

In various example embodiments, one or more portions of the network 880 may be an ad hoc network, an intranet, an extranet, a virtual private network (VPN), a local area network (LAN), a wireless LAN (WLAN), a WAN, a wireless WAN (WWAN), a metropolitan area network (MAN), the Internet, a portion of the Internet, a portion of the public switched telephone network (PSTN), a plain old telephone service (POTS) network, a cellular telephone network, a wireless network, a Wi-Fi® network, another type of network, or a combination of two or more such networks. For example, the network 880 or a portion of the network 880 may include a wireless or cellular network, and the coupling 882 may be a Code Division Multiple Access (CDMA) connection, a Global System for Mobile communications (GSM) connection, or another type of cellular or wireless coupling. In this example, the coupling 882 may implement any of a variety of types of data transfer technology, such as Single Carrier Radio Transmission Technology (1×RTT), Evolution-Data Optimized (EVDO) technology, General Packet Radio Service (GPRS) technology, Enhanced Data rates for GSM Evolution (EDGE) technology, third Generation Partnership Project (3GPP) including 3G, fourth generation wireless (4G) networks, Universal Mobile Telecommunications System (UMTS), High-Speed Packet Access (HSPA), Worldwide Interoperability for Microwave Access (WiMAX), Long-Term Evolution (LTE) standard, others defined by various standard-setting organizations, other long-range protocols, or other data-transfer technology.

The instructions 816 may be transmitted or received over the network 880 using a transmission medium via a network interface device (e.g., a network interface component included in the communication components 864) and utilizing any one of a number of well-known transfer protocols (e.g., HTTP). Similarly, the instructions 816 may be transmitted or received using a transmission medium via the coupling 872 (e.g., a peer-to-peer coupling) to the devices 870. The terms "transmission medium" and "signal medium" mean the same thing and may be used interchangeably in this disclosure. The terms "transmission medium" and "signal medium" shall be taken to include any intangible medium that is capable of storing, encoding, or carrying the instructions 816 for execution by the machine 800, and include digital or analog communications signals or other intangible media to facilitate communication of such software. Hence, the terms "transmission medium" and "signal medium" shall be taken to include any form of modulated data signal, carrier wave, and so forth. The term "modulated data signal" means a signal that has one or more of its characteristics set or changed in such a manner as to encode information in the signal.

Computer-Readable Medium

The terms "machine-readable medium," "computer-readable medium," and "device-readable medium" mean the same thing and may be used interchangeably in this disclosure. The terms are defined to include both machine-storage media and transmission media. Thus, the terms include both storage devices/media and carrier waves/modulated data signals.

What is claimed is:

1. A system comprising:
   a non-transitory computer-readable medium having instructions stored thereon, which, when executed by a processor, cause the system to perform operations comprising:
   obtaining a first set of training data, the first set of training data comprising pairs of job titles and standardized job title identifications;
   obtaining a second set of training data, the second set of training data comprising pairs of job titles and skills;
   feeding the first set of training data into a deep convolutional neural network (DCNN) designed to train a prediction model to output a prediction score indicating a likelihood that an input candidate job title matches an input job title identification;
   feeding the second set of training data into the DCNN in order to retrain the prediction model;
   feeding a first candidate job title and a plurality of candidate job title identifications into the prediction model, producing a prediction score for each pairing of the first candidate job title and a candidate job title identification; and
   saving a mapping between the first candidate job title and a candidate job title identification from the plurality of candidate job title identifications having a highest prediction score.

2. The system of claim 1, wherein the feeding the first set of training data into the DCNN comprises:
   passing the first set of training data to a convolutional layer of the DCNN, the convolutional layer comprising one or more filters having dynamically adjustable weights, the one or more filters configured to filter the first set of training data to produce an output volume for each piece of the first set of training data, the output volume comprising a different feature map for each of the one or more filters;
   passing the output volume from the convolutional layer through a nonlinearity layer, the nonlinearity layer applying a nonlinearity function to the output volume from the convolutional layer;
   passing the output volume from the nonlinearity layer through a pooling layer, the pooling layer lowering dimensions of the output volume from the nonlinearity layer;
   passing the output volume from the pooling layer through a classification layer, the classification layer comprising a specialized convolutional layer having a filter designed to output a prediction score for each piece of the first set of training data based on the output volume from the pooling layer;
   passing the first set of training data through a loss layer, the loss layer applying a loss function to the first set of training data, resulting in an indication of a level of error in the prediction score for each piece of the first set of training data from the classification layer in comparison to a prediction score from a label for each piece of the first set of training data;
   determining whether a combination of the levels of error for the first set of training data transgresses a preset threshold; and
   in response to a determination that the combination of the levels of error transgresses the preset threshold, updating the weights of the one or more filters in the convolutional layers of the DCNN to reduce the combination of the levels of error and repeating the training of the DCNN using a different set of training data.

3. The system of claim 1, wherein the first set of training data is obtained from a taxonomy of title identifications having a stored mapping between the title identifications and titles.

4. The system of claim 1, wherein the first set of training data is obtained from member profiles of members of an online service, the member profiles each being written in at least two languages.

5. The system of claim 1, wherein the first set of training data is obtained from machine-translated titles.

6. The system of claim 1, wherein the first set of training data is obtained from a grouping of titles similar in characters to other titles.

7. The system of claim 1, wherein the second set of training data is obtained from member profiles of members of an online service.

8. A computer-implemented method, comprising:
obtaining a first set of training data, the first set of training data comprising pairs of job titles and standardized job title identifications;
obtaining a second set of training data, the second set of training data comprising pairs of job titles and skills;
feeding the first set of training data into a deep convolutional neural network (DCNN) designed to train a prediction model to output a prediction score indicating a likelihood that an input candidate job title matches an input job title identification;
feeding the second set of training data into the DCNN in order to retrain the prediction model;
feeding a first candidate job title and a plurality of candidate job title identifications into the prediction model, producing a prediction score for each pairing of the first candidate job title and a candidate job title identification; and
saving a mapping between the first candidate job title and a candidate job title identification from the plurality of candidate job title identifications having a highest prediction score.

9. The method of claim 8, wherein the feeding the first set of training data into the DCNN comprises:
passing the first set of training data to a convolutional layer of the DCNN, the convolutional layer comprising one or more filters having dynamically adjustable weights, the one or more filters configured to filter the first set of training data to produce an output volume for each piece of the first set of training data, the output volume comprising a different feature map for each of the one or more filters;
passing the output volume from the convolutional layer through a nonlinearity layer, the nonlinearity layer applying a nonlinearity function to the output volume from the convolutional layer;
passing the output volume from the nonlinearity layer through a pooling layer, the pooling layer lowering dimensions of the output volume from the nonlinearity layer;
passing the output volume from the pooling layer through a classification layer, the classification layer comprising a specialized convolutional layer having a filter designed to output a prediction score for each piece of the first set of training data based on the output volume from the pooling layer;
passing the first set of training data through a loss layer, the loss layer applying a loss function to the first set of training data, resulting in an indication of a level of error in the prediction score for each piece of the first set of training data from the classification layer in comparison to a prediction score from a label for each piece of the first set of training data;
determining whether a combination of the levels of error for the first set of training data transgresses a preset threshold; and
in response to a determination that the combination of the levels of error transgresses the preset threshold, updating the weights of the one or more filters in the convolutional layers of the DCNN to reduce the combination of the levels of error and repeating the training of the DCNN using a different set of training data.

10. The method of claim 8, wherein the first set of training data is obtained from a taxonomy of title identifications having a stored mapping between the title identifications and titles.

11. The method of claim 8, wherein the first set of training data is obtained from member profiles of members of an online service, the member profiles each being written in at least two languages.

12. The method of claim 8, wherein the first set of training data is obtained from machine-translated titles.

13. The method of claim 8, wherein the first set of training data is obtained from a grouping of titles similar in characters to other titles.

14. The method of claim 8, wherein the second set of training data is obtained from member profiles of members of an online service.

15. A non-transitory computer-readable storage medium comprising instructions, which when implemented by one or more machines, cause the one or more machines to perform operations comprising:
obtaining a first set of training data, the first set of training data comprising pairs of job titles and standardized job title identifications;
obtaining a second set of training data, the second set of training data comprising pairs of job titles and skills;
feeding the first set of training data into a deep convolutional neural network (DCNN) designed to train a prediction model to output a prediction score indicating a likelihood that an input candidate job title matches an input job title identification;
feeding the second set of training data into the DCNN in order to retrain the prediction model;
feeding a first candidate job title and a plurality of candidate job title identifications into the prediction model, producing a prediction score for each pairing of the first candidate job title and a candidate job title identification; and
saving a mapping between the first candidate job title and a candidate job title identification from the plurality of candidate job title identifications having a highest prediction score.

16. The non-transitory computer-readable storage medium of claim 15, wherein the feeding the first set of training data into the DCNN comprises:
passing the first set of training data to a convolutional layer of the DCNN, the convolutional layer comprising one or more filters having dynamically adjustable weights, the one or more filters configured to filter the first set of training data to produce an output volume for each piece of the first set of training data, the output volume comprising a different feature map for each of the one or more filters;
passing the output volume from the convolutional layer through a nonlinearity layer, the nonlinearity layer applying a nonlinearity function to the output volume from the convolutional layer;

passing the output volume from the nonlinearity layer through a pooling layer, the pooling layer lowering dimensions of the output volume from the nonlinearity layer;

passing the output volume from the pooling layer through a classification layer, the classification layer comprising a specialized convolutional layer having a filter designed to output a prediction score for each piece of the first set of training data based on the output volume from the pooling layer;

passing the first set of training data through a loss layer, the loss layer applying a loss function to the first set of training data, resulting in an indication of a level of error in the prediction score for each piece of the first set of training data from the classification layer in comparison to a prediction score from a label for each piece of the first set of training data;

determining whether a combination of the levels of error for the first set of training data transgresses a preset threshold; and in response to a determination that the combination of the levels of error transgresses the preset threshold, updating the weights of the one or more filters in the convolutional layers of the DCNN to reduce the combination of the levels of error and repeating the training of the DCNN using a different set of training data.

17. The non-transitory computer-readable storage medium of claim 15, wherein the first set of training data is obtained from a taxonomy of title identifications having a stored mapping between the title identifications and titles.

18. The non-transitory computer-readable storage medium of claim 15, wherein the first set of training data is obtained from member profiles of members of an online service, the member profiles each being written in at least two languages.

19. The non-transitory computer-readable storage medium of claim 15, wherein the first set of training data is obtained from machine-translated titles.

20. The non-transitory computer-readable storage medium of claim 15, wherein the first set of training data is obtained from a grouping of titles similar in characters to other titles.

* * * * *